Sept. 29, 1953

E. P. G. WRIGHT 2,653,999

ECHO SUPPRESSOR INSERTION

Filed April 22, 1948

3 Sheets-Sheet 1

Inventor
Edmond Phillip Goodwin Wright
By Robert Harding Jr.
Attorney

Sept. 29, 1953 E. P. G. WRIGHT 2,653,999

ECHO SUPPRESSOR INSERTION

Filed April 22, 1948 3 Sheets-Sheet 2

Inventor
Edmond Phillip Goodwin Wright
By
Robert Harding Jr
Attorney

Sept. 29, 1953 E. P. G. WRIGHT 2,653,999

ECHO SUPPRESSOR INSERTION

Filed April 22, 1948 3 Sheets-Sheet 3

Inventor
Edmund Phillip Goodwin Wright
By Robert Harding Jr.
Attorney

Patented Sept. 29, 1953

2,653,999

UNITED STATES PATENT OFFICE 2,653,999

ECHO SUPPRESSOR INSERTION

Esmond Philip Goodwin Wright, London, England, assignor to International Standard Electric Corporation, New York, N. Y., a corporation of Delaware Application April 22, 1948, Serial No. 22,605
In Great Britain April 29, 1947

6 Claims. (Cl. 179—16)

This invention relates to long distance telecommunication exchange systems and to the provision of echo suppressors.

The use of echo suppressors of course, gives rise to extra cost and they also introduce certain difficulties particularly in channels used for voice frequency signalling, for which purpose echo suppressor by-paths are usually provided.

It is the object of the present invention to reduce the use of echo suppressors to a minimum in long distance communication with special reference to international telephone communication.

The feature of the invention comprises equipment for inserting an echo suppressor into a telecommunication exchange connection comprising means for recording whether a channel to be used in a connection is of second class character in respect of liability to echo, means for recording whether another portion of a connection is of second class character in respect of liability to echo, means for checking whether both said recording means are operated, and means controlled by said checking means for inserting an echo suppressor in a connection.

Another feature of the invention comprises equipment for use in determining whether an echo suppressor is to be inserted in a connection comprising means for checking and recording whether a channel to be used in a connection of a second class character in respect of liability to echo and means for signalling such information over a connection to a point at which a final decision regarding insertion of an echo suppressor in the connection is to be made.

The invention will be particularly described with reference to an embodiment shown in the accompanying drawings in which:

Fig. 1 shows sufficient of the circuits at the outgoing end of an international trunk, while

Figure 1:
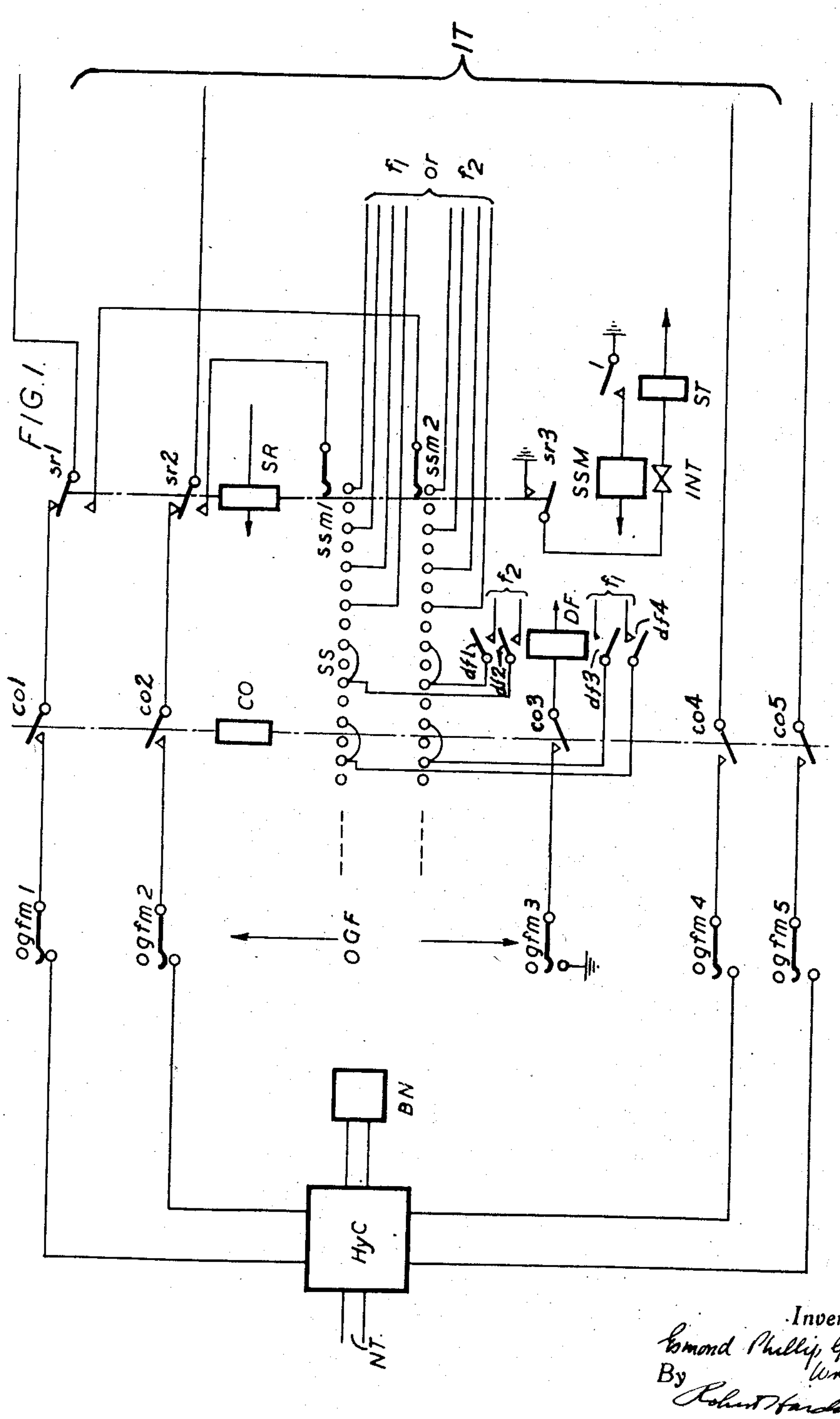

Referring first to Fig. 1, it is assumed that a call over the national network to which a calling party is connected has been extended by an international operator at the head of the line that is, the junction point between the national and international trunk, via the two-wire line NT, the hybrid coil HyC and balancing network BN, and the finder switch OGF to an outgoing four-wire international trunk, IT.

The cut-off relay CO of the finder switch OGF has operated in well known manner to connect through the four wires of the trunk via wipers *ogfm* 1, 2, 4, 5 of switch OGF and contacts *co* 1, 2, 4, 5 of relay CO.

National circuits to the head of the line will be classified in three categories, first class, fast operating circuits for which no question of providing echo suppressors arises, second class circuits which of themselves do not necessitate the use of echo-suppressors but which if one is used in conjunction with a similar incoming national circuit at the far end in the same connection together, would necessitate an echo-suppressor; third class circuits which of themselves alone necessitate the use of echo suppressors. It is assumed that all international circuits are first class or fast operating circuits which do not contribute to the need for echo suppressors.

For first class national circuits, no action need be taken. For third class national circuits echo suppressors will either be permanently fitted or automatically inserted every time such a circuit is used, in well known manner.

With second class circuits, however, it is desired to reduce the use of echo-suppressors to a minimum and it is therefore proposed that an echo suppressor will be inserted when a connection includes two second class circuits, one at each end, but that when a connection includes a second class circuit at one end but a first class circuit at the other end no echo suppressor will be used. This calls for discrimination as to the class of national circuits in use in a connection.

Referring again to Fig. 1, the wiper *ogfm* 3 is provided for discrimination and earth is connected to contacts of *ogfm* 3 for second class national circuits. If such a circuit is in use, earth via *ogfm* 3, *co* 3 front operates relay DF.

Switch SS is a digit and sending control switch which will be marked in well-known manner by digit storage equipment set from the International Operator's key set. The switch bank is divided into consecutive sets of eight contacts, and alternate contacts of each set, that is four contacts in all are marked with individual frequencies selected from two frequencies, *f*1, *f*2. By this means, code signals, each of four consecutive frequency elements, are sent per digit, such a signal code giving adequate combinations for ten digital values.

The circuit of Fig. 1 is arranged so that in well-known manner, when digit transmission is to begin, a relay SR will be operated to connect the code sending equipment to line via *sr1*, *sr2* and to energise a stepping circuit for switch SS by energising relay ST, via interrupter springs INT of SS and *sr3* front. Front contacts *sr1*, *sr2* are connected to wipers *ssm1*, *ssm2* so that as switch SS steps from contact to contact, spaced frequency pulses will be impressed on the international trunk IT. Relay ST energises magnet SSM of switch SS which opens INT to release ST, which in turn, opens the circuit of ST and an inter-acting stepping circuit is thus formed to step SS along its bank.

The marking connections to the first set of contacts, in banks *ssm1*, *ssm2* are from digit storage equipment (not shown). The marking connections to the second set of contacts are however, under control of contacts *df1*—*df4* of relay DF which, if operated, connect a discriminating code consisting of frequencies *f2*, *f2*, *f1*, *f1* to the second contact set and via wipers *ssm1* and *ssm2* to the line. If relay DF is not operated, switch SS steps idly over the second set of contacts. Further digits are transmitted via further sets of contacts associated with wipers *ssm1*, *ssm2* (indicated by dash lines), and relay SR will be released in known manner when all digits have been sent to disconnect the sending equipment from the line and to stop switch SS.

There are well-known circuit expedients for stepping a switch rapidly, when desired, and any such expedient could be used to step switch SS rapidly over the second set of contacts when relay DF is not operated.

Figure 2:
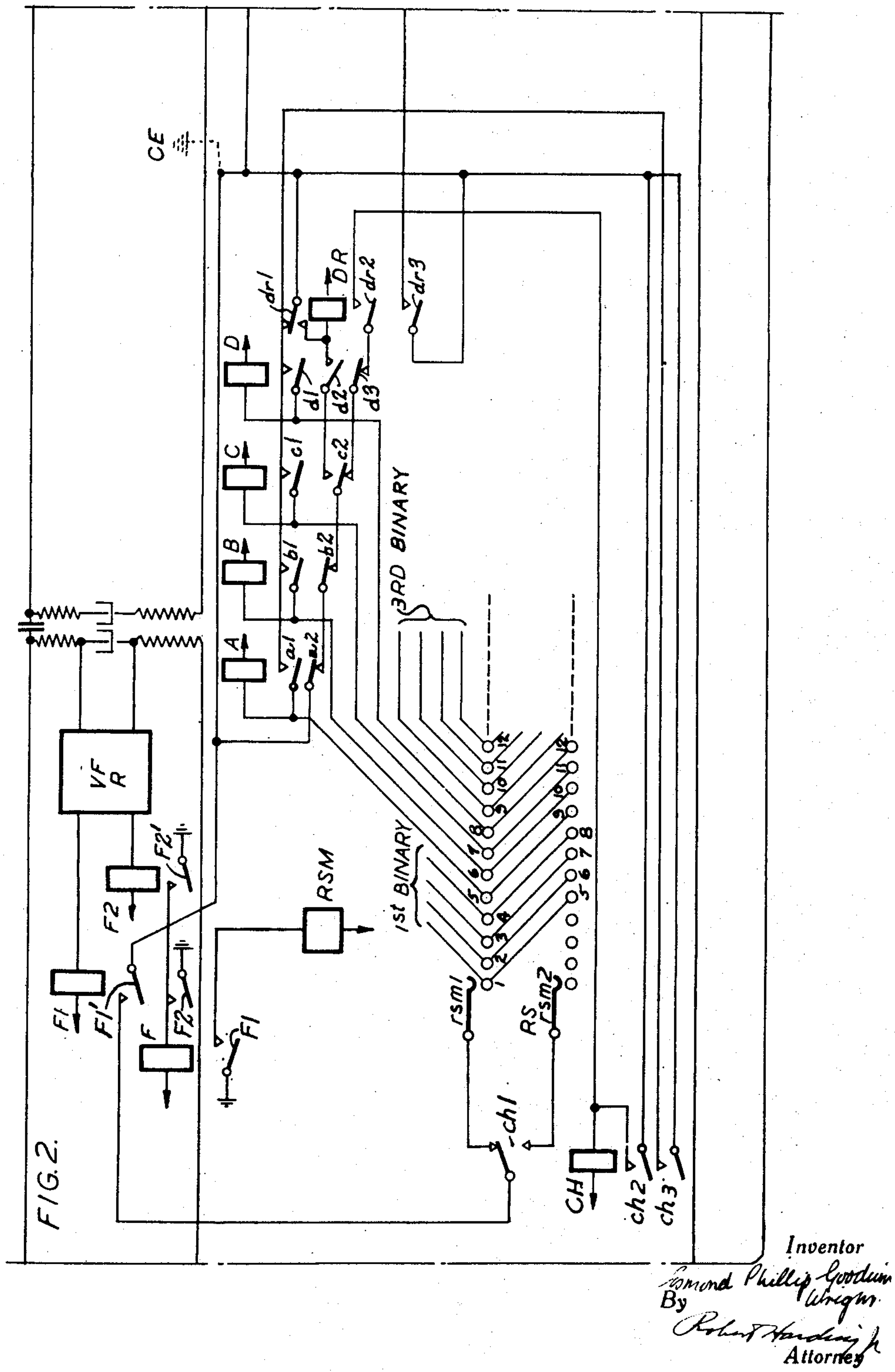
Fig. 2 shows sufficient of the circuits at the incoming end of an international trunk to explain the invention, and is to be placed to the right hand side of Fig. 1.

Referring now to Fig. 2, which shows the equipment located at the incoming end of the international 4 wire trunk IT and to which the incoming digital code signals are received on voice frequency receiver VFR. Pulses of frequency *f1* operate relay F1 and pulses of frequency *f2* operate relay F2, operation of either relay F1, F2 energises relay F which, in turn, operates magnet RSM of stepping switch RS. At the end of a pulse relays F1 or F2, F, and magnet RSM release and switch RS takes a step.

During a pulse of frequency *f1*, but not of frequency *f2*, a common earth CE, rendered operative in well known manner, when the circuit was seized, is connected via *f11* front, *ch1* back, wiper *rsm1* to a relay such as A, B, C or D dependent upon which contact the wiper *rsm1* is standing, each of said last named relays being connected to different contacts as shown in the drawing.

Relays A, B, C, D constitute a set of code storage relays adapted to store four-element codes received over the line and operate on a binary basis. It will be noted that relays A–D are shown connected to contacts 5–8 of the bank associated with wiper *rsm1*. Other sets of four relays will be connected to contacts 1–4, 9–12, and so on, as indicated, the relay sets being called 1st binary, 2nd binary, etc. It will be noted that there is a set of slipped connections between banks *rsm1*, *rsm2*, contacts 1–4 of *rsm1* being connected to contacts 5–8 of *rsm2*, and so on, the purpose of these slipped connections will be explained below.

Each received pulse steps switch RS but the code storage relays are selectively operated by the *f1* pulses only due to the common earth selectively applied via contact *f11*, as traced before.

It will be noted that if no discriminating second code indicating a second class outgoing national circuit is received, the second digit of the wanted number will be received on the second binary storage relay group A–D. If, however, a discriminating second code is sent from the outgoing end, it will be recorded on the said second binary relay storage group A–D which group later will be re-used to receive the second digit of the wanted number. Said discriminating second code is a unique code used for no other purpose than to indicate that the outgoing national line belongs to the aforesaid second class and operates relays C, D only. Thus, a separate relay group for the discriminating second code is not required. It will be noted that relays A–D are arranged to lock over their front contacts *a1*–*d1* and back contact *dr1* to common earth CE. If relays C, D alone operate, earth from CE via back contacts *a2*, *b2*, and front contacts *c2*, *d2*, energises relay DR which locks via *dr1* to CE and opens the locking circuits of relays C, D at *dr1* so that these relays release and the second binary relay group A–D is available to receive the next code. Earth from CE via back contacts *a2*, *b2*, *c2*, *d3*, and front contacts *dr2* now energises relay CH which locks via *ch2* front to CE and provides an alternative locking circuit from CE via *ch3* front for relays A–D.

Contacts *ch1* now connect *f11* front to wiper *rsm2*, instead of *rsm1*, so that relays A–D are now connected to *f11* via contacts 9–12 of the bank associated with wiper *rsm2* instead of via contacts 5–8 of the bank associated with wiper *rsm1* and the next code is also recorded on relays A–D and held thereon. Thus the first, second, third, etc., digits of the wanted national number are always recorded on the first, second, third, etc., relay groups respectively, whether or not a discriminating code is received.

The determination as to whether or not the far end or incoming national circuits as required for the call are second class is a function of the national exchange code received on the code storage relays, Fig. 2. In well-known manner, a marking circuit is completed via the digit-storage relay groups, only one of which A–D, is shown in Fig. 2, when an exchange code of a second class national route has been recorded. This marking circuit operates relay IDF, Fig. 3, which locks via *idf1* to CE, Fig. 2, and which closes an operating circuit for relay ESR via *idf2*, front Fig. 3, and *dr3* front, Fig. 2 to CE.

Thus relay ERS operates, and locks via *esr3* to CE only if both the outgoing and incoming national routes are second class. Contacts *esr1*, *esr2*, and *esr4*, *esr5* change over and act to selectively connect the two, two-wire channels of the four-wire line (Fig. 3) via echo-suppressor ES to hybrid coil IHyC terminating the outgoing national trunk instead of directly to said coil.

Figure 3:
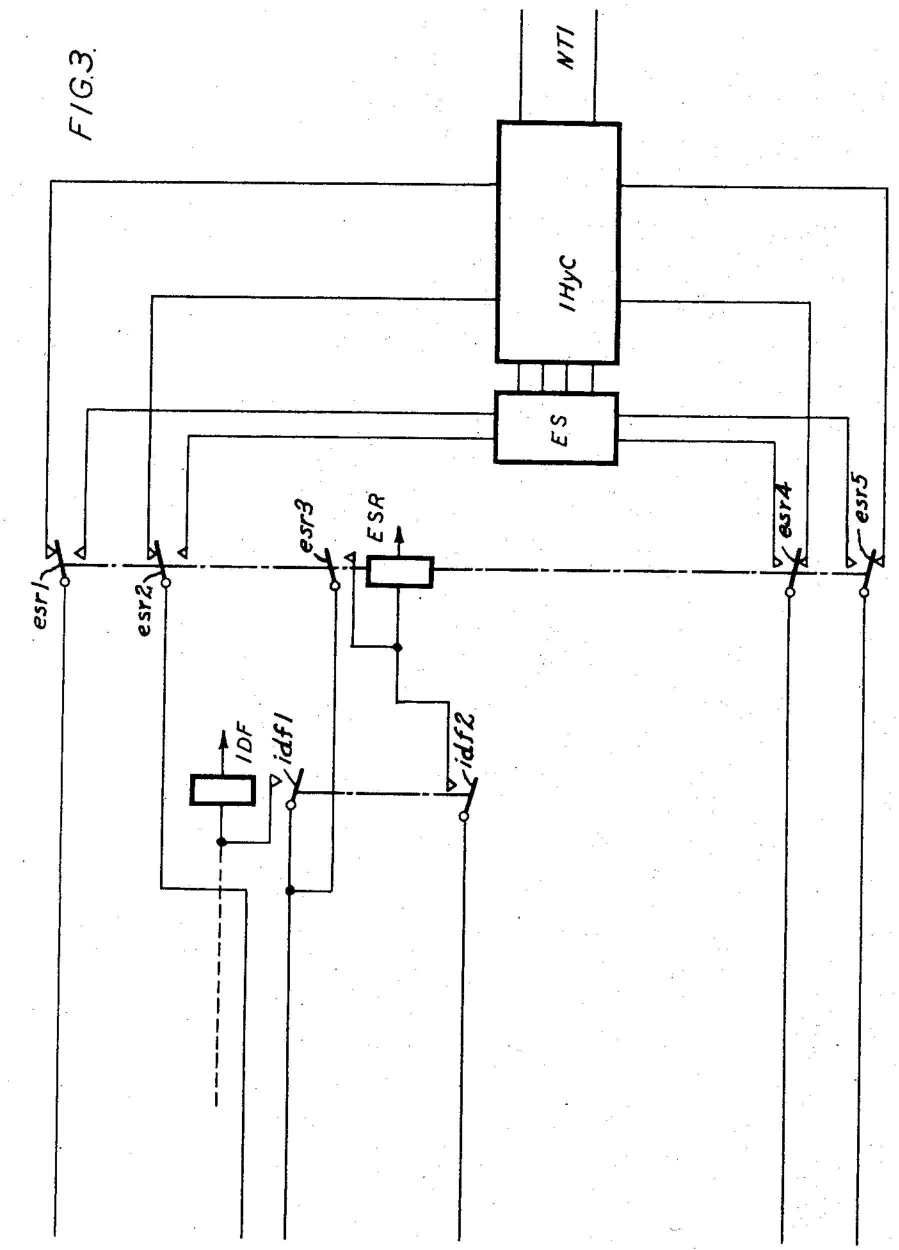
Fig. 3 shows additional equipment at the incoming end of an international trunk and is to be placed to the right hand side of Fig. 2.

It will be clear that the determination of the class of national route at the incoming end could be determined by a check of the actual route seized by utilizing a condition applied to its contact in a discriminating bank of a switch over which the individual route is seized in a manner similar to that in which relay DF, Fig. 1, was operated. This would allow of possible variations in the character of the national route seized, e. g., due to alternative trunking. Again, a combined check of the wanted national exchange code and of the outgoing trunk seized from the international exchange could be made.

Where the check of the character of the incoming national route is made solely on the wanted exchange code as described in detail above, it would be possible to make the complete check at the outgoing end where the wanted national exchange code is stored and where the same discrimination which is shown in Fig. 3 could equally well be made if information of the class of routes in the distant country was made available to the outgoing country and used as the basis for setting up discriminating circuits. In such a case, the echo-suppressor for two doubtful routes would be inserted at the outgoing head of the line instead of at the incoming end. Such a scheme is open to objection, as any change of condition in any one country would have to be signalled to all other countries accessible therefrom but the possibility is within the scope of the present invention.

I claim:

1. A telecommunication system having a plurality of exchanges controlling channels of different types and comprising switch means for establishing a connection between any channel of a first exchange and any channel of a second exchange through said exchanges, said switch means comprising means at said first exchange for transmitting to said second exchange predetermined signals indicative of connection to said first exchange of a particular type of channel and for transmitting to said second exchange channel selecting signals, an echo suppressing means, means for selectively connecting said echo suppressing means in circuit with said exchanges, means at said second exchange for receiving and recording signals from said first exchange and means at said second exchange for operating said selective-connecting means in response to receipt of said predetermined signals and a predetermined one of said selecting signals indicating the interconnection of two channels of a predetermined type.

2. A telecommunication system comprising a plurality of calling and called speech channels, a transmission path for interconnecting said channels, first means for connecting said calling channels to said path and second means for connecting said called channels to said path, said first means comprising switching means connected to said path and selectively connectable to said calling channels, means connected to said path for transmitting selecting signal codes corresponding to said called channels and means controlled by said switching means for transmitting a predetermined signal code responsive to connection of a predetermined one of said calling channels to said switching means, an echo suppressor, switching means for selectively connecting said path directly to said called channel or to said called channel through said echo suppressor, and means connected to said path for operating said last-mentioned connecting means to include said echo suppressor in response to receipt of a predetermined one of said selecting signal codes and of said predetermined signal code.

3. A telecommunication system comprising a plurality of calling and called speech channels, a transmission path for interconnecting said channels, first means for connecting said calling channels to said path and second means for connecting said called channels to said path, said first means comprising switching means connected to said path and selectively connectable to said calling channels, means connected to said path for transmitting selecting signal codes corresponding to said called channels and means controlled by said switching means for transmitting a predetermined signal code responsive to connection of a predetermined one of said calling channels to said switching means, an echo suppressor, switching means for connecting said called channel to said path, means for selectively connecting said suppressor between a calling and a called channel and means connected to said transmitting means for operating said last-mentioned connecting means in response to receipt of a predetermined one of said selecting signal codes and of said predetermined signal code.

4. A telecommunication system for interconnecting calling speech channels with called speech channels, predetermined interconnections of said channels requiring echo suppression means, said system comprising a transmission channel, means connected to said transmission channel for generating channel designation signal codes, switching means for selectively connecting said calling channels to said transmission channel, means connected to said switching means and to said generating means for transmitting one of said designation codes responsive to a predetermined selective connection of a calling channel, switching means for selectively connecting said called channels to said transmission channel in response to said channel designating code, an echo suppressor, means for selectively connecting said echo suppressor between said calling and called channels and means connected to said transmission channel and to said selective connecting means for receiving and recording said codes and for operating said last-mentioned connecting means in response to receipt of said designation code for a predetermined called channel.

5. A telecommunication system for interconnecting calling speech channels with called speech channels, predetermined interconnections of said channels requiring echo suppression means, said system comprising a transmission channel, means connected to said transmission channel for generating channel designation signal codes, switching means for selectively connecting said calling channels to said transmission channel, means connected to said switching means and to said generating means for transmitting one of said designation codes responsive to a predetermined selective connection of a calling channel, an echo suppressor, switching means operative into two positions for selectively connecting in one of its positions a called channel directly to said transmission channel and in the other of its positions for connecting said echo suppressor between said called channel and said transmission channel and means connected to said transmission channel and to said last-mentioned switching means for receiving said codes and for operating said last-mentioned switching means to its other position in response to receipt of said designation code for said called channel.

6. A telecommunication system for interconnecting calling speech channels with called speech channels, predetermined interconnections of said channels requiring echo suppression means, said system comprising a transmission channel, means connected to said transmission channel for transmitting signals at different frequencies in predetermined sequences, multi-position switching means connectable in different positions to different calling channels, means connected to said transmitting means and to said switching means and operable in a predetermined position of said switching means to transmit a predetermined sequence of said signals, an echo suppressor, means for connecting a called channel to said transmission channel comprising switching means operative into two positions for connecting in one of its positions said called channel to said transmission channel directly and for alternatively connecting in the other of its positions said called channel to said transmission channel in series with said echo suppressor, and means for controlling said last-mentioned switching means comprising means connected to said transmission channel for receiving and selecting said signals, means connected to said receiving and selecting means and to said last-mentioned switching means for moving said switching means into its said other position in response to receipt of signals in said predetermined sequence.

ESMOND PHILIP GOODWIN WRIGHT.

References Cited in the file of this patent

UNITED STATES PATENTS

| Number | Name | Date |
|---|---|---|
| 1,560,544 | Crisson | Nov. 10, 1925 |
| 1,855,779 | Tharp | Apr. 26, 1932 |
| 2,025,145 | Bascom | Dec. 24, 1935 |
| 2,294,237 | McKim | Aug. 25, 1942 |
| 2,355,958 | Davis | Aug. 15, 1944 |